Dec. 16, 1941.   O. SCHWAGER   2,266,444
INTERNAL COMBUSTION ENGINE
Filed Nov. 26, 1938   2 Sheets-Sheet 1

INVENTOR:
OTTO SCHWAGER
by A. A. Clarke
ATTORNEY

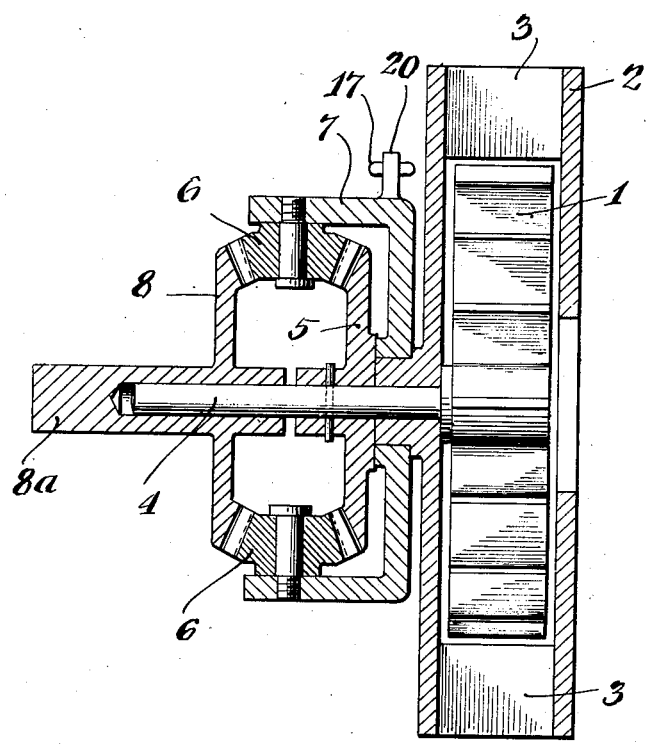

Patented Dec. 16, 1941

2,266,444

UNITED STATES PATENT OFFICE 2,266,444

INTERNAL COMBUSTION ENGINE

Otto Schwager, Munich, Germany, assignor to the firm: Bayerische Motoren Werke Aktiengesellschaft, Munich, Germany Application November 26, 1938, Serial No. 242,518
In Germany November 27, 1937

14 Claims. (Cl. 123—140)

It is an object of the present invention to provide means for regulating the quantity of fuel injected by the fuel injection pump of fuel injection internal combustion engines provided with a supercharger by varying the fuel injection in accordance with the torque required to drive the supercharger.

In internal combustion engines with fuel injection into the cylinders, the injection pump must be so regulated that there is always injected into the cylinder a weight of fuel corresponding to the required weight of charge. As long as the internal combustion engine operates with a constant air density the regulation of the injected quantity can be effected in accordance with the position of the throttle valve by connecting the regulating rod of the injection pump by a lever mechanism, with a pre-determined law of movement, to the throttle valve located in the induction pipe of the engine.

As soon as the altitude of the internal combustion engine varies there occurs a certain difficulty as the fuel and air ratio of the internal combustion engine is dependent on the air density. The regulation of the injected quantity must therefore be effected in accordance with the air density.

When the internal combustion engine is fitted with a supercharger for maintaining a predetermined constant engine power up to predetermined flying altitudes, which in the case of recent air craft engines is always the case, the charge of the internal combustion engine is no longer dependent solely on the position of the throttle valve and the air density, but it is also influenced relatively by the reduced exhaust back pressure.

In connection with these internal combustion engines there thus arises the problem of suitably regulating the injected quantity of fuel mixture exactly in accordance with the air passed through the engine.

It is an object of the present invention to provide means whereby the fuel supply of an internal combustion engine may be regulated directly in accordance with the amount of air passed through the engine.

The air passed through the engine is a function of the dimensions of the charger, of the air density and the air velocity, which latter itself is a function of the design of the charger. In the same manner, the torque at the charger shaft is a function of the said design of charger and the air density, so that, since the design of the charger remains constant, the torque at the charger shaft constitutes a measurement of the amount of air passed. The torque at the charger shaft may alternatively be measured by the torque transmitted to the housing including guide or diffuser vanes which is also a function of the same magnitudes, i. e., of the design of the charger and the air density.

It is an object of the invention, to utilize this torque for regulating the injection pump in that either in the supercharger rotor shaft there is included a type of planetary gearing, from the rotatably mounted planetary satellite gears or sun gears from which the torque is measured and transmitted to a spring which is more or less compressed according to the magnitude of the torque, or the guide apparatus is rotatably mounted and the spring influenced by the reaction of the air upon the rotatable mounting. The spring movement is used for moving the regulating rod of the injection pump, whilst the included lever mechanism provides that the paths are such that there is injected a fuel quantity corresponding with the air passed.

As the air passed depends directly on the air velocity whereas the torque is proportional to the square of the air velocity the spring tension or the linkage of the lever mechanism must be so influenced in accordance with the prevailing speed that the movements of the regulating rod correspond with the air passed at any time. This may be effected either by the provision of a cam influencing the spring tension which cam is connected to the adjusting mechanism for the propellor pitch varying device or to a centrifugal governor or also by influencing the lever mechanism itself in a similar way. It is therefore another object to provide means whereby the torque applied for driving the supercharger may be utilized to control the amount of fuel delivered to the engine.

Another object is to provide a method whereby the above mentioned objects may be accomplished.

Other objects will be apparent from the following description taken in connection with the attached drawings showing two illustrative embodiments of the invention and wherein:

Fig. 1a is a cross-section taken on the line 1a—1a of Fig. 1;

Figure 1:
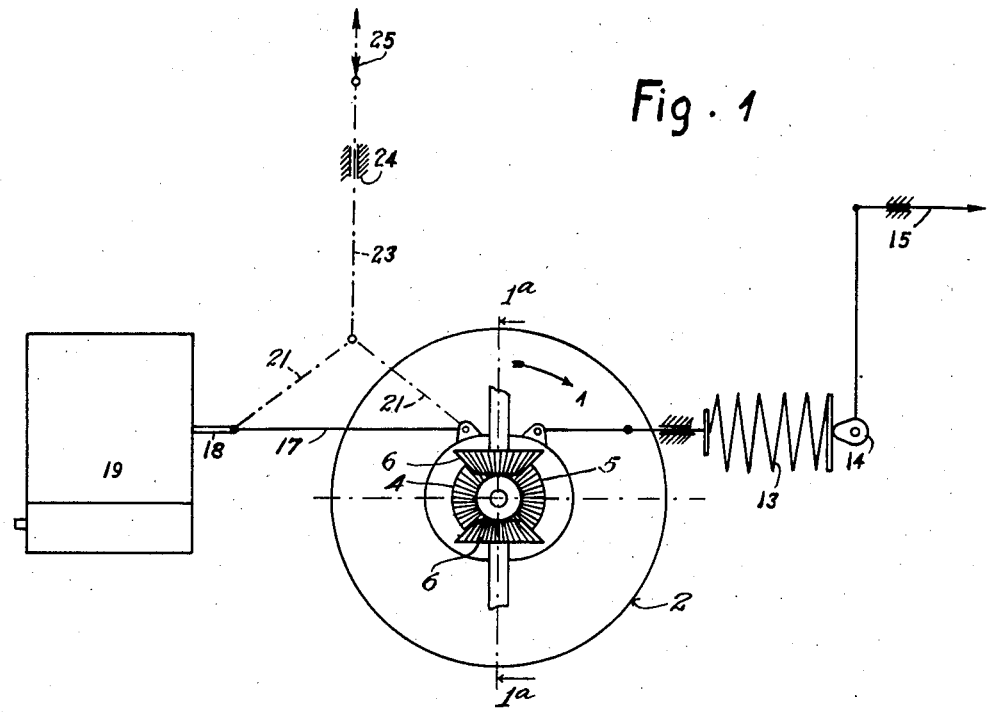
Fig. 1 shows an illustrative form of embodiment of the invention in which the torque in the driving shaft of the supercharger is measured by means of its reaction upon planetary gearing.

Referring to Figs. 1 and 1a, the numeral 1 indicates generally the supercharger impeller which is mounted for rotation in a housing 2 of normal or standard construction which, preferably, is provided with diffuser vanes 3. In the form of construction shown in Figs. 1 and 1a, the housing is preferably firmly attached to the engine parts. The impeller 1 is mounted for rotation with a shaft 4 having a bearing within the housing. Attached to shaft 4 is a sun gear 5 of the bevel type in the form shown with which engage one or more satellite bevel pinions 6 which are journaled upon studs carried by spider 7 which is journaled for at least partial rotation relative to the housing 2. The numeral 8 indicates another sun bevel gear also meshing with pinion 6 and provided with a shaft extension 8a which may be the power input shaft for the supercharger. It will be seen that upon the application of power to shaft 8a the shaft 4 and impeller 1 will rotate in the opposite direction and that furthermore the spider 7 will attempt to rotate upon its axis, the torque tending to cause such rotation being proportional to the torque applied to the impeller. The numeral 13 indicates a spring, one end of which bears upon the spider 7 and the other end of which bears upon a cam 14. The numeral 15 indicates schematically a linkage connected with the speed selecting lever of the adjustable propeller or to a suitable centrifugal governor. The numeral 17 indicates a connecting rod connected at one end to the spider 7 and connected at the other end to the regulating rod 18 of a standard fuel injection pump 19. Instead of using the cam 14 and the rod mechanism 15, suitable means may be provided for changing the effective length of rod 17, as by forming it as a toggle linkage, using toggle links 21 to which are connected the rod 23 guided at 24 and connected at 25 with the propeller adjusting mechanism or a suitable centrifugal governor.

Figure 2:
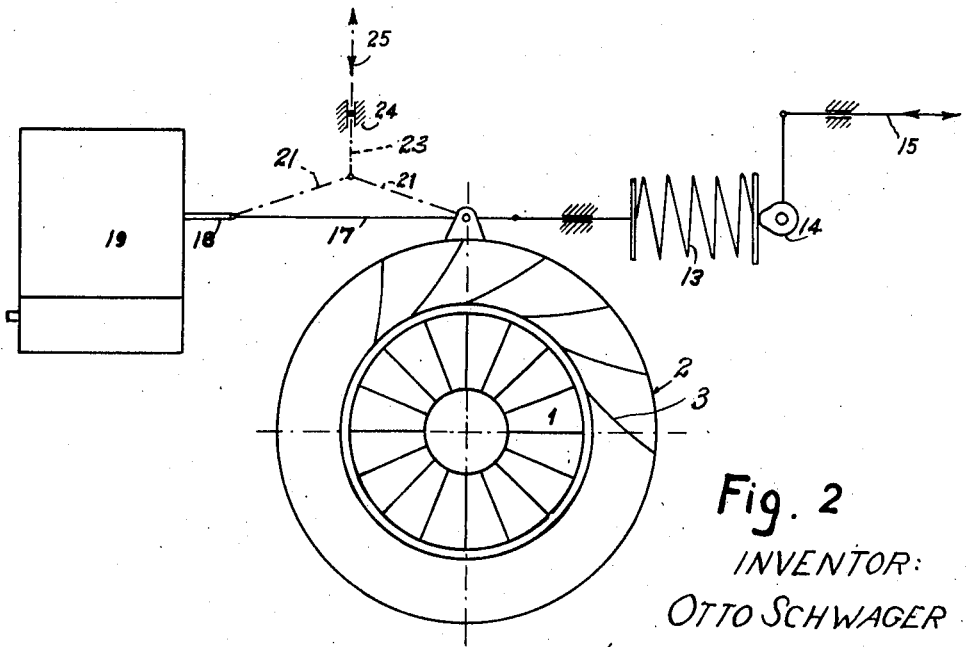
Fig. 2 illustrates a modified form of construction in which the torque of the diffuser housing is utilized for the purpose of regulating the fuel supply.

Referring to the form shown in Fig. 2, it is to be understood that the parts referred to by reference numerals 13 to 25 inclusive may be the same as those parts of Figs. 1 and 1a referred to by the same numerals. In this form, the numeral 1 refers to the impeller which operates in a housing generally designated 2, which is preferably provided with diffuser vanes 3. In this case, the housing instead of being mounted rigidly is mounted for partial rotation at least about the axis of the impeller. As the torque applied to the impeller is a function of the torque applied to the housing, the housing will serve as a means for measuring the torque applied to the impeller.

Having thus described two illustrative embodiments of the invention, it is to be understood that although specific forms have been shown and specific terms employed, they are used in a generic and a descriptive sense and not for purposes of limitation, the scope of the invention being set forth in the following claims.

I claim:

1. In combination with an internal combustion engine provided with a fuel supply regulating means and a supercharger, means controlled by the torque required to drive the supercharger for adjusting the fuel supply regulating means.

2. In combination with an internal combustion engine provided with a fuel supply regulating means and a supercharger, means adjusted in accordance with the torque required to drive the supercharger, and connecting means from said adjusted means to said fuel supply regulating means, whereby the fuel supply is regulated in accordance with the torque required to drive said supercharger.

3. In combination with an internal combustion engine provided with a fuel injection pump, means for regulating the amount of fuel delivered thereby and a supercharger, means controlled by the torque required to drive the supercharger for adjusting the regulating means of said fuel injection pump.

4. In combination with an internal combustion engine provided with a fuel injection pump, means for regulating the amount of fuel delivered thereby and a supercharger, means adjusted in accordance with the torque required to drive the supercharger, and connecting means from said adjusted means to said fuel pump regulating means, whereby the fuel delivered by said pump is regulated in accordance with the torque required to drive said supercharger.

5. The combination according to claim 2 in which said connecting means is adjusted in accordance with the speed of the engine.

6. The combination according to claim 2 in which said connecting means is adjusted in accordance with engine speed responsive means.

7. The combination according to claim 2 in which the torque responsive means comprises a planetary gearing between the supercharger driving shaft and the supercharger.

8. The combination according to claim 2 in which spring means is arranged to act upon said connecting means and means are provided for adjusting said spring means in accordance with the speed of the engine.

9. The combination according to claim 2 in which the torque responsive means comprises a planetary gearing between the supercharger driving shaft and the supercharger including satellite gears, means carrying said satellite gears for planetary movement, and spring means for resisting said planetary movement.

10. The combination according to claim 2 in which the torque responsive means comprises a planetary gearing between the supercharger driving shaft and the supercharger including satellite gears, means carrying said satellite gears for planetary movement, and spring means for resisting said planetary movement together with means for adjusting said spring means in accordance with the speed of the engine.

11. In combination with an internal combustion engine provided with a fuel supply regulating means and a rotary supercharger including a rotarily mounted supercharger diffuser housing, spring means resisting rotation of said housing, whereby said housing is adjusted in accordance with the torque required to drive the supercharger, and connecting means from said housing to said fuel supply regulating means, whereby the fuel supply is regulated in accordance with the torque required to drive said supercharger.

12. The combination according to claim 11 together with means for adjusting said spring means in accordance with the speed of the engine.

13. Method for the regulation of the fuel supply of an internal combustion engine having fuel supply adjusting means and a rotary supercharger, comprising the steps of (1) measuring the torque required to drive said supercharger, and (2) setting said fuel supply adjusting means in accordance with said torque.

14. Method for the regulation of the fuel supply of an internal combustion engine having a fuel supply pump and means for adjusting the volume of fuel delivered by said pump and a rotary supercharger, comprising the steps of (1) measuring the torque required to drive said supercharger and (2) setting said pump adjusting means in accordance with said torque.

OTTO SCHWAGER.